(12) United States Patent
Farhangi et al.

(10) Patent No.: US 8,484,637 B2
(45) Date of Patent: Jul. 9, 2013

(54) PARALLEL INSTALLATION

(75) Inventors: Alireza Farhangi, Kirkland, WA (US); Israel Hilerio, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1459 days.

(21) Appl. No.: 11/732,446

(22) Filed: Apr. 3, 2007

(65) Prior Publication Data

US 2008/0250405 A1    Oct. 9, 2008

(51) Int. Cl.
*G06F 9/445* (2006.01)

(52) U.S. Cl.
USPC ............ 717/177; 717/121; 717/122; 717/176

(58) Field of Classification Search
USPC ................. 717/176, 171, 172, 177, 178, 121, 717/122
See application file for complete search history.

(56) References Cited

U.S. PATENT DOCUMENTS

| | | | | |
|---|---|---|---|---|
| 5,630,124 A * | 5/1997 | Coyle et al. | ............................. | 1/1 |
| 5,870,611 A * | 2/1999 | Shrader et al. | ................ | 717/175 |
| 5,907,673 A * | 5/1999 | Hirayama et al. | ............. | 714/16 |
| 6,173,420 B1 * | 1/2001 | Sunkara et al. | ............. | 714/38.14 |
| 6,182,086 B1 * | 1/2001 | Lomet et al. | ........................... | 1/1 |
| 6,363,499 B1 * | 3/2002 | Delo et al. | ..................... | 714/16 |
| 6,434,710 B1 * | 8/2002 | Sato et al. | ......................... | 714/2 |
| 6,438,749 B1 * | 8/2002 | Chamberlain | ................ | 717/174 |
| 6,460,175 B1 | 10/2002 | Ferri et al. | | |
| 6,588,011 B1 * | 7/2003 | Giammaria | ................... | 717/174 |
| 6,594,752 B1 * | 7/2003 | Baxter | ............................ | 712/43 |
| 6,625,152 B1 | 9/2003 | Monsen et al. | | |
| 6,691,245 B1 * | 2/2004 | DeKoning | .................... | 714/6.31 |
| 6,718,538 B1 * | 4/2004 | Mathiske | ...................... | 717/129 |
| 6,801,949 B1 | 10/2004 | Bruck et al. | | |
| 6,865,737 B1 * | 3/2005 | Lucas et al. | ................... | 717/178 |
| 6,883,120 B1 * | 4/2005 | Banga | .......................... | 714/47.1 |
| 6,981,004 B2 * | 12/2005 | Ganesh et al. | ........................ | 1/1 |
| 7,020,706 B2 | 3/2006 | Cates et al. | | |
| 7,103,650 B1 * | 9/2006 | Vetrivelkumaran et al. | .. | 709/221 |
| 7,155,715 B1 * | 12/2006 | Cui et al. | ....................... | 717/177 |
| 7,206,805 B1 * | 4/2007 | McLaughlin, Jr. | ............ | 709/203 |
| 7,237,140 B2 * | 6/2007 | Nakamura et al. | ............. | 714/4.5 |
| 7,266,816 B1 * | 9/2007 | Sharma et al. | ................ | 717/170 |
| 7,287,069 B1 * | 10/2007 | Kavasseri et al. | ............ | 709/221 |
| 7,290,166 B2 * | 10/2007 | Rothman et al. | ............. | 714/6.11 |
| 7,389,108 B2 * | 6/2008 | Pedlar et al. | ............... | 455/432.1 |
| 7,398,524 B2 * | 7/2008 | Shapiro | ......................... | 717/175 |
| 7,467,378 B1 * | 12/2008 | Sobel | ............................ | 717/168 |

(Continued)

OTHER PUBLICATIONS

Chen et al., "CLIP: A checkpointing tool for message-passing parallel programs", 1997.*

(Continued)

*Primary Examiner* — Phillip H Nguyen
(74) *Attorney, Agent, or Firm* — Michael B Dodd; Dodd Law Group

(57) ABSTRACT

Installation of multiple servers with interdependencies is done in parallel steps, with each server advancing in sequence with other servers. When a second server is dependent on a first server during the installation process, the first server may finish a task and send a message to the second server to attempt an installation step that depends on the first server. If a problem occurs, the second server may revert to a configuration state before the attempted step and the first server may reattempt the installation step on which the second server depends.

20 Claims, 6 Drawing Sheets

U.S. PATENT DOCUMENTS

| | | | |
|---|---|---|---|
| 7,529,198 B2* | 5/2009 | Jain et al. | 370/256 |
| 7,590,669 B2* | 9/2009 | Yip et al. | 1/1 |
| 7,698,391 B2* | 4/2010 | Paliwal et al. | 709/220 |
| 7,926,051 B2* | 4/2011 | Barta et al. | 717/174 |
| 8,239,855 B2* | 8/2012 | Wetherell et al. | 717/175 |
| 2002/0174108 A1* | 11/2002 | Cotner et al. | 707/3 |
| 2002/0184499 A1* | 12/2002 | Taguchi et al. | 713/168 |
| 2003/0055967 A1 | 3/2003 | Worley | |
| 2004/0060045 A1* | 3/2004 | Hind et al. | 717/174 |
| 2004/0167906 A1 | 8/2004 | Smith et al. | |
| 2005/0102665 A1* | 5/2005 | Barta et al. | 717/174 |
| 2005/0102666 A1 | 5/2005 | Barta et al. | |
| 2005/0102667 A1* | 5/2005 | Barta et al. | 717/174 |
| 2006/0026319 A1* | 2/2006 | Rothman et al. | 710/100 |
| 2006/0095708 A1 | 5/2006 | Sater et al. | |
| 2007/0169075 A1* | 7/2007 | Lill et al. | 717/168 |
| 2007/0198665 A1* | 8/2007 | De Matteis et al. | 709/220 |
| 2008/0120129 A1* | 5/2008 | Seubert et al. | 705/1 |

OTHER PUBLICATIONS

Shafi et al., "Integrating Checkpoints and Thread Migration for Cluster Management", 2003.*

Kona, et al., "A Framework for Network Management using Mobile Agents", Date: 2002, http://ieeexplore.ieee.org/iel5/7926/21854/01016643.pdf?isNumber=.

Pease, et al., "IBM Storage Tank a Distributed Storage System", Date: Jan. 23, 2002, http://www.usenix.org/events/fast02/wips/pease.pdf.

Watanabe, et al., "Relis-G: Remote Library Install System for Computational Grids", 2004, http://ieeexplore.ieee.org/iel5/9244/29307/01324015.pdf?isNumber=.

* cited by examiner

PARALLEL INSTALLATION

BACKGROUND

Some network applications operate with two or more devices operating in conjunction with each other or have dependencies on each other. For example, a network may be configured with two or more servers that may share a common file system or execute separate applications that interact with each other, such as a server that hosts email services while another server performs anti-virus scanning of incoming email.

Installing and configuring several interacting servers can be frustratingly complex if a portion of a second server installation is dependent on the successful installation of a portion of a first server. Often, the first server installation problem may not be detected until the second server attempts installation. When such a problem is detected, the installation process on the second server may be aborted and the first server installation may be reattempted.

SUMMARY

Installation of multiple servers with interdependencies is done in parallel steps, with each server advancing in sequence with other servers. When a second server is dependent on a first server during the installation process, the first server may finish a task and send a message to the second server to attempt an installation step that depends on the first server. If a problem occurs, the second server may revert to a configuration state before the attempted step and the first server may reattempt the installation step on which the second server depends.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
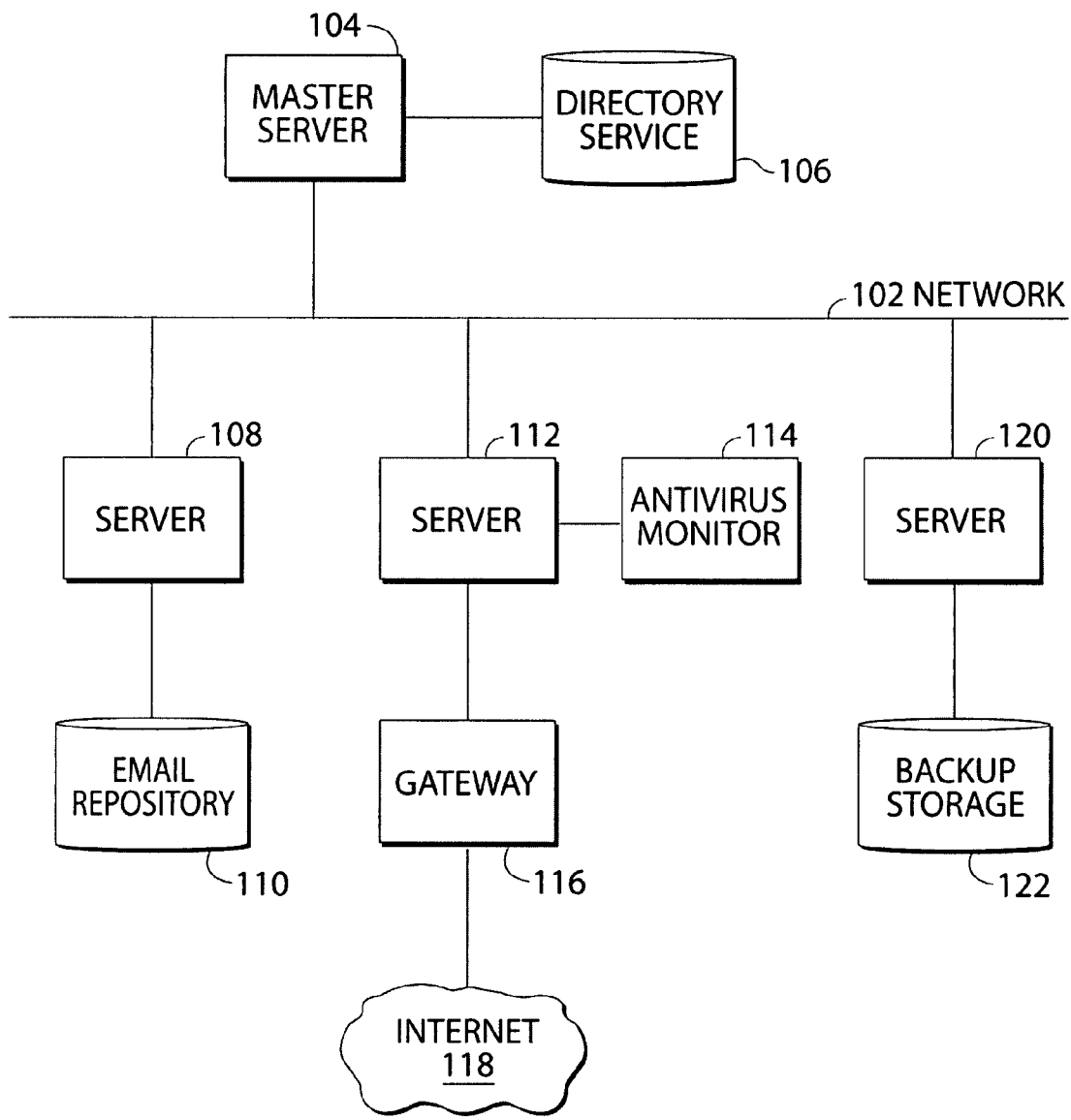
FIG. 1 is a diagram of an embodiment showing a system with multiple servers.

Many applications or functions may operate across several servers or devices, and in such applications one server function may depend on a second server function. When installing interdependent servers, the installation functions of each server are begun in parallel. At various points during the installation process when an interdependent function may be installed, each dependent server may pause installation until the independent server completes the portion of installation on which the dependent servers depend.

The dependent devices or clients may attempt installation of a dependent component, and if successful, notifies the independent server which may continue the installation process. If each of the dependent clients are not successful, both the independent and dependent devices may rollback the installation to a previous point so that the independent device may retry the installation portion on which the dependent devices depend.

The coordination of the installation activities is performed by a master device that coordinates messaging and decision points across the master and one or more client devices. In some cases, a master device may be configured to operate with predetermined client devices, while in other cases a master device may discover client devices on a network to coordinate installation.

Throughout this specification, references to 'servers' may include any device that operates in conjunction with another device. The device may include a computer server, and may also include hand held mobile devices, network appliances, storage systems, personal computers, personal digital assistants, network routing and signaling devices, gateways, or any other network connected device, be it connected through a hardwired network, a wireless network, or over the Internet. Any reference to 'server' or 'device' shall be interpreted to also refer to any such device on any network connection.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with multiple servers. A network 102 has a master server 104 that has a directory service 106. Server 108 is connected to the network 102 and has an email repository 110. Server 112 is likewise attached to the network 102 and has an antivirus monitor application 114. Server 112 connects to a gateway 116 which is connected to a wide area network such as the Internet 118. Server 120 has a backup storage system 122 and is also connected to the network 102.

Embodiment 100 is an example of a system of networked servers that may be found in a small business, enterprise, or other situation. The several servers may provide various functions to client devices that may be connected to the network 102. For example, the master server 104 may provide shared directory services, the server 108 may provide messaging and email services, server 112 may provide virus protection and connectivity to the Internet 118, and server 120 may provide backup services. When two or more servers are used on a network, the workload may be spread across the servers.

The servers 108, 112, and 120 may operate on the network 102 as server computers. However, during an installation process, the servers 108, 112, and 120 may act as client devices to the master server 104.

The installation of operating systems, applications, and various software components and services over the several servers may be performed using an organized and choreographed installation process. The installation process synchronizes the installation of several servers by a master server 104 such that multiple servers progress through an installation process in parallel, with the various processes, components, and services being installed in sequence based on their dependencies. The process may have a sequence defined for each of the servers with defined checkpoints where one or more of the servers may wait for another server to complete a task before continuing.

The installation of software on several servers may be complicated when there are dependencies between servers. A first server may provide a service that is used by a second server. A typical example may be that a shared directory service may be installed on the master server 104 before the server 108 may install and operate an email system, since the email system may use the shared directory service. Similarly, the backup system on server 120 may not operate or even successfully install until the directory service 106 is properly operational on the master server 104.

One of the difficulties of installation is that an installation may be performed but the installed component may not be properly functioning. When a second server attempts to install and operate a process that depends on the first server, the second server may detect a problem in the first server's installation. The installation process may be able to rollback to a previous checkpoint so that an error may be corrected in the first server.

The rollback feature of the installation process may enable an administrator to correct and fix a problem as soon as possible. In an independent or serial installation process, a first server may be completely installed by an administrator, who may then begin installation of a second server. The administrator may be disappointed and frustrated to find out during installation of the second server that the first server's installation was improper, and may have to abort installation of the second server and reinstall the first server.

The installation process may be used for installing any set of software, services, components, or other configuration or setup procedure that has dependencies between different devices. The devices may be server computers, such as in the example of embodiment 100, but may also be any type of device that operates in a dependent or interdependent nature with another device. The parallel installation process using checkpoints may be used to install operating software for peer-to-peer networking devices, networked industrial controllers, client-server applications, or any other situation where one device is dependent on another device. In some embodiments, the installation process may be used for distributing and installing client-server software over a large domain of several hundred or even thousands of devices.

The various functions performed by an installation process may include installing operating systems, software applications, software components, databases, drivers, or any other process for configuring a device to perform a function. The installation process may also include configuring hardware and software services, authenticating and registering hardware and software, connecting to or enabling network based services, or any other process.

For the purposes of this specification, an example of installing components on several servers may be used, but the example is only intended to highlight concepts of the installation process, which may be applied to any set of devices.

Figure 2:
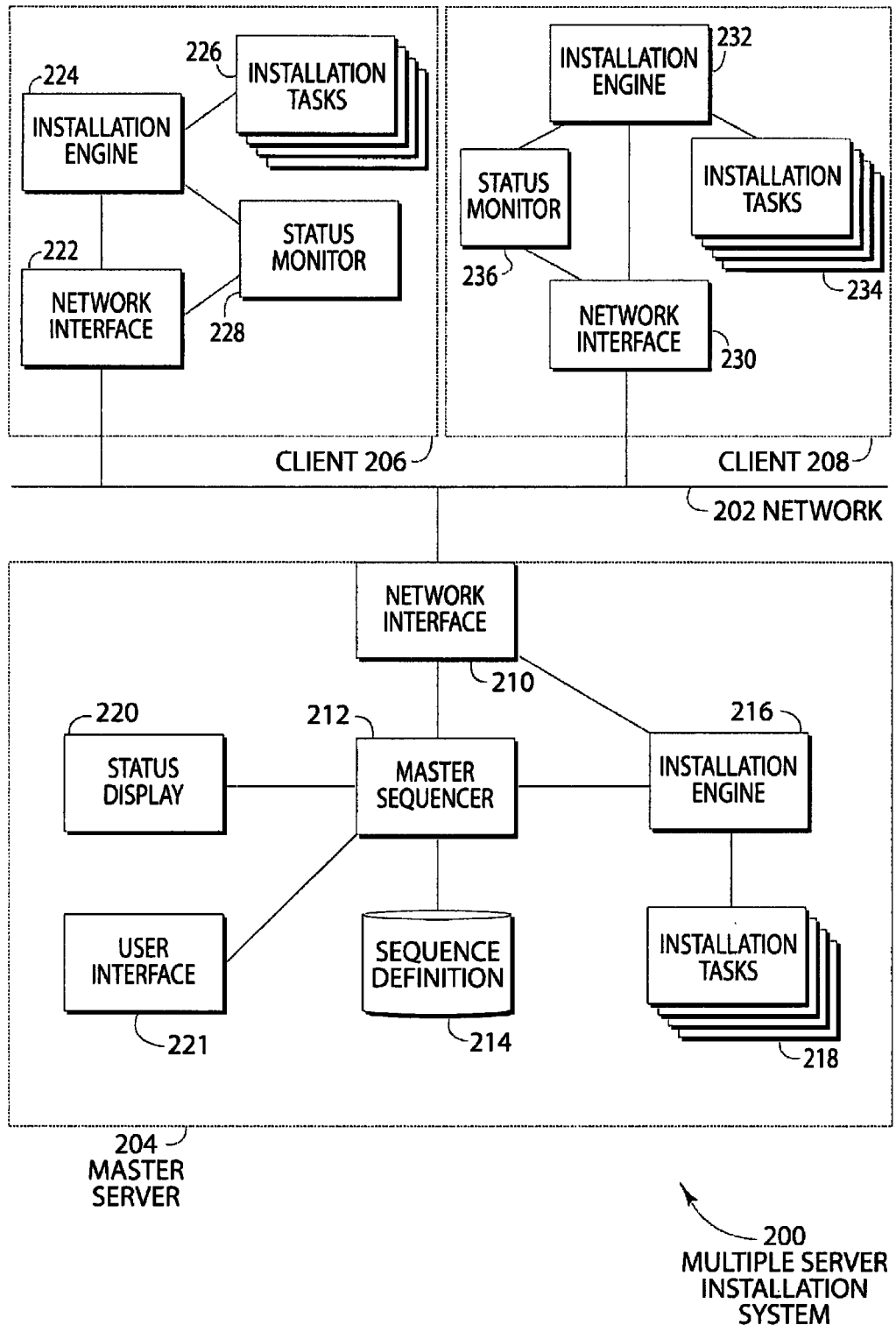
FIG. 2 is a diagram of an embodiment showing a software architecture for a system with multiple servers.

FIG. 2 is a diagram of an embodiment 200 showing a multiple server installation system. Attached to the network 202 are master server 204 and clients 206 and 208.

Master server 204 may perform the task of synchronizing or coordinating installation across the various devices. The master server 204 has a network interface 210 and a master sequencer 212. The master sequencer 212 may read a sequence definition 214 and use the sequence definition 214 to coordinate the activities of the various servers.

In some instances, the master server 204 may distribute portions of the sequence definition 214 to the clients 206 and 208, each of the portions being a sequence of tasks that are to be performed by a specific server. In other instances, each server may have a predefined sequence of installation tasks to perform.

In an embodiment when the master sequencer 212 determines the sequence of installation tasks for other devices, the master sequencer 212 may send instructions to complete each task on a task by task basis. In some such embodiments, the master sequencer 212 may send executable or data files to each client device in lieu or the installation tasks 226 and 234. In other cases, executable or data files may be transferred to be used in conjunction with the installation tasks 226 and 234.

The master sequencer 212 may have a status display 220 that may display the overall status of the installation process. The status may be generated by data obtained from the various devices. Similarly, the master sequencer 212 may include a user interface 221.

The user interface 221 may be a user interface that enables an administrator to input data that are used by the various servers during installation. As each server requests data from the administrator, a messaging system may be used to present data and request data on the user interface 221 for any of the various servers. After an administrator has viewed, edited, and completed entering data for a particular server task, the data may be transmitted to the server that is performing the task. In some cases, identical or similar tasks may be performed by two or more servers during installation. In such a case, data may be entered at one time and in one place and be shared across the servers.

Having a single user interface 221 for the installation of multiple components spread across several devices may eliminate administrator fatigue, but may also enable the management of components on remote devices which may be inaccessible to an administrator. For example, client 208 may be connected to the network 202 through the Internet and may be located in a different office or even a different country.

The master server 204 may have an installation engine 216 that may execute various installation tasks 218. In many cases, the installation tasks 218 may be individual executable or interpreted files that are adapted to perform a step or portion of a step for an installation sequence. One or more installation tasks 218 may be perform the installation operations between different checkpoints in the overall installation sequence. Other embodiments may have alternative configurations.

The client 206 has a network interface 222 and an installation engine 224 that may cause the installation tasks 226 to be executed. The client 206 may also have a status monitor 228 adapted to communicate with the master sequencer 212 to create output on the status display 220.

Similarly, client 208 has a network interface 230 and an installation engine 232 that may cause the installation tasks 234 to be executed. The client 208 may also have a status monitor 236 adapted to communicate with the master sequencer 212 to create output on the status display 220.

In some embodiments, the installation engines 216, 224, and 232 on the respective servers may be identical, as well as the available set of installation tasks 218, 226, and 234. In order to customize each server to be configured in specific manners, a unique sequence definition may be defined for each server. The sequence definition executed by each server may execute a subset of installation tasks for the particular server so that the individual servers may have unique characteristics or be adapted to perform individual tasks. Such an embodiment may be desired when a single, generic set of installation media may be produced that contains a library of installation tasks that may be used by a generic installation engine. The generic installation media may be used by each of the several servers but used to configure each of the servers in different manners.

In other embodiments, a single set of installation media may be provided for a master server. The master server may distribute installation tasks to other client devices when each of the devices executes a particular task.

The status monitors 228 and 236 may periodically determine a status for the respective installation engine or task being performed by the installation engine. The status monitors may transmit the status to the status display 220. The status display 220 may be a centralized status indicator that gives a status of the entire installation process. In some embodiments, the status display 220 may have a progress bar that summarizes and aggregates the completion of all of the servers performing the installation sequence. In other embodiments, the status display 220 may include individual status items for each server, including the current task, any error messages, important data being used by the server, or any other data.

Figure 3A:
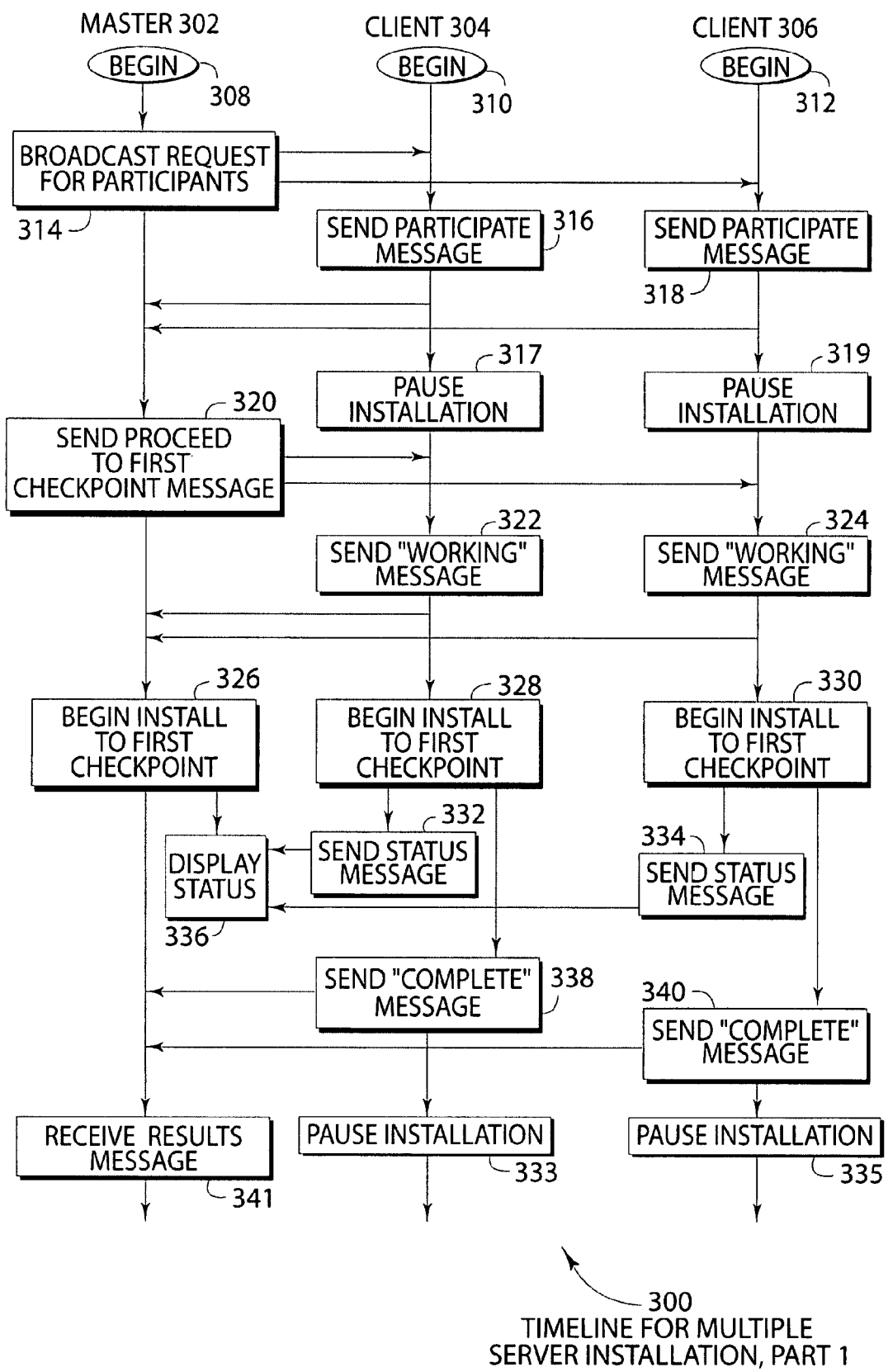
FIG. 3A is a timeline diagram of an embodiment showing a first part of a multiple server installation process.

FIG. 3A is a timeline illustration of an embodiment 300 showing the first part of a multiple server installation. The left column shows the actions of a master server 302, the center column shows that of a client 304, and the right column shows the actions of client 306. Each device begins the installation process in blocks 308, 310, and 312, respectively.

Master server 302 broadcasts a request for participants in block 314, and client 304 sends a participate request in block 316 while client 306 sends a participate request in block 318. After sending the participate messages, the clients 304 and 306 pause the installation process in blocks 317 and 319, respectively. The request for participants in block 314 may be one mechanism for starting installation process in a coordinated manner. The request for participants may be used to simply establish communications between the various devices and establish that the master server 302 will act in the role of master device.

In many instances, the master server 302 may be configured to perform an installation process over a specific number of other devices. For example, the master server 302 may be configured beforehand to coordinate the installation process over two servers. In some instances, the master server 302 may be configured with the addresses of the clients 304 and 306 and thus send direct messages to each server rather than broadcast a request for participants.

In other instances, the master server 302 may be configured to perform an installation process with any number of other devices. In such an instance, the master server 302 may have a mechanism to determine which device is to perform which installation sequence. Such a mechanism may include a user interface through which a user may select which devices are to participate in the installation process and which operations each device will perform.

Another of such mechanisms may include a discovery routine that discovers and analyzes hardware and software components and capabilities of the various devices. Based on the discovery results, the master server may determine a best fit for each of the components to be installed. A user interface may enable an administrator or user to verify or change the recommended settings.

The installation process may proceed with the master server 302 sending a proceed to first checkpoint message in block 320. The message is received by client 304, which sends a 'working' message in block 322. Similarly, the message is received by client 306, which sends a 'working' message in block 324. The 'working' message may act as a handshaking message. The master server 302 and client 304 and 306 each begin the installation process to the first checkpoint in blocks 326, 328, and 330, respectively.

As each server is performing an installation process, the clients 304 and 306 are sending a status message in blocks 332 and 334, respectively to the master server 302. The master server 302 is displaying a status in block 336, which may include the status of the master server 302 as well. In many instances, the status displayed in block 336 may be an aggregated status of all three devices 302, 304, and 306 during the installation process to the first checkpoint.

The installation processes performed by each of the servers may be identical to the processes performed by the other servers in some instances. In other instances, the processes performed by each of the servers may be different. In some instances, a server may perform no installation activity between checkpoints when the server's next installation process may be dependent on the successful subsequent installation of a component on another server.

As each of the clients 304 and 306 complete the installation to the first checkpoint, the clients 304 and 306 send a 'complete' message in blocks 338 and 340. The 'complete' message may indicate that the respective server has successfully reached the specified checkpoint and is waiting to proceed. The results messages are received by the master server 302 in block 341. The clients 304 and 306 pause installation in blocks 333 and 335, respectively.

Figure 3B:
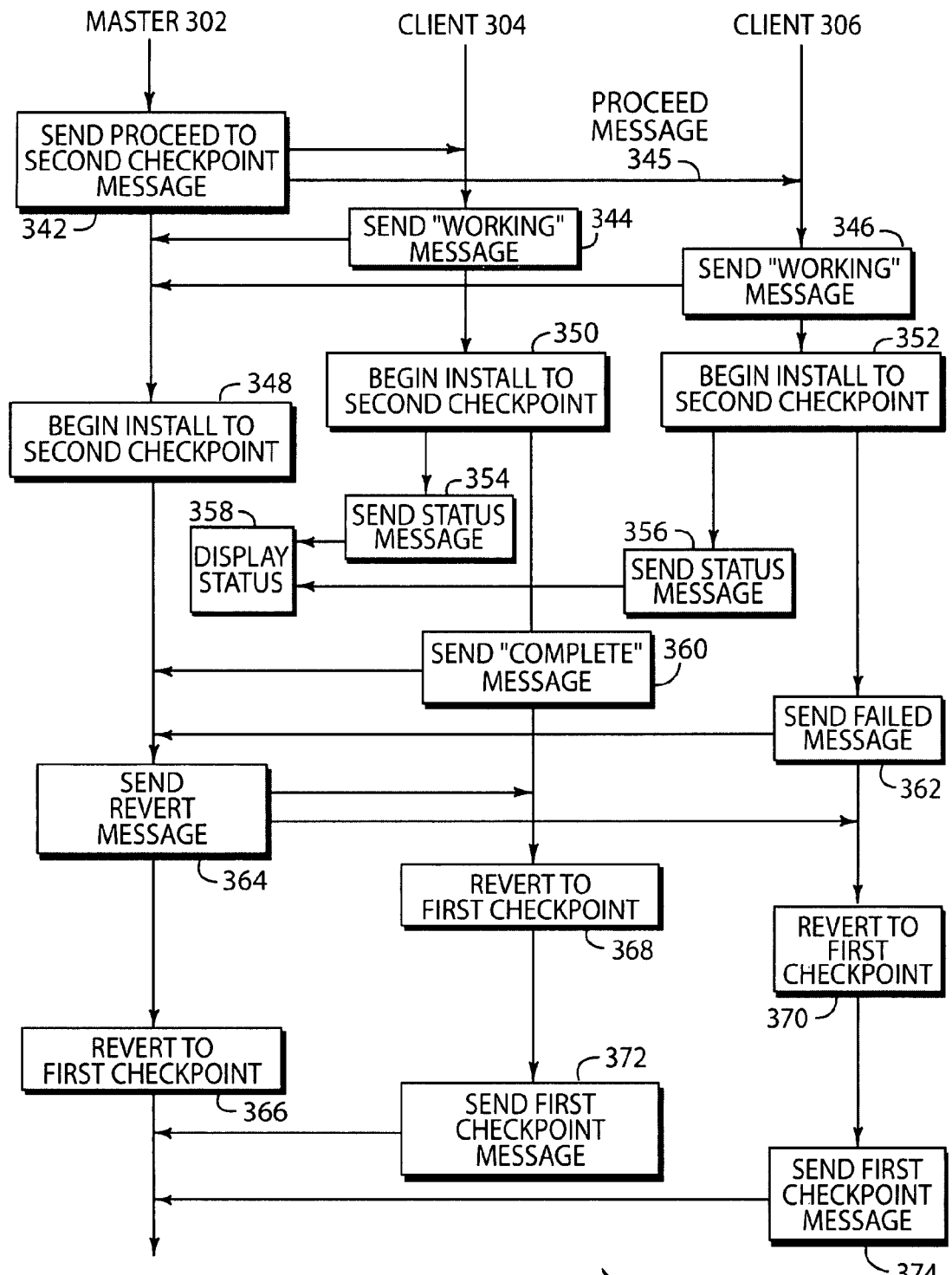
FIG. 3B is a timeline diagram of an embodiment showing a second part of a multiple server installation process.

FIG. 3B is a timeline illustration of an embodiment 301 showing a continuation of the timeline of embodiment 300 in FIG. 3A. As in FIG. 3A, the left column shows the actions of a master server 302, the center column shows that of a client 304, and the right column shows the actions of client 306.

The master server 302 sends a proceed message to second checkpoint message 345 in block 342. As with the first checkpoint discussed above, the clients 304 and 306 send 'working' messages in blocks 344 and 346, respectively. Each device 302, 304, and 306 begins the installation process to the second checkpoint in blocks 348, 350, and 352.

As each device is performing an installation process, the clients 304 and 306 are sending a status message in blocks 354 and 356, respectively to the master server 302. The master server 302 is displaying a status in block 358, which may include the status of the master server 302 as well.

Client 304 may complete the installation tasks to the second checkpoint and send a 'complete' message in block 360.

Client 306 may attempt the installation task to the second checkpoint but encounter an error and send an 'error' message to master server 302 in block 362.

Because an error has occurred during the installation of client 306, the master server 302 may send a 'revert' message in block 364, causing the clients 304 and 306 to revert to the first checkpoint in blocks 368 and 370. Similarly, master server 302 may revert to the first checkpoint in block 366. The clients 304 and 306 may send messages to master server 302 indicating that their status is that of the first checkpoint in blocks 372 and 374.

The process of reverting to a previous checkpoint may give and administrator an opportunity to change input values, adjust settings, or perform other analysis to determine a cause of the failure of client 306. In some instances, the administrator may have an option to revert one, two, or more steps backward to correct a problem or make a change and retry the installation steps.

During each installation process between checkpoints, the user may be prompted to view, change, edit, or manipulate data that are used by one or more of the installation processes.

When a consolidated user interface is used, an administrator may be requested to enter data for each of the separate servers, and those data may be transmitted to the appropriate server for executing the individual installation task. When a process is reverted to a previous checkpoint, the administrator may be given an opportunity to change values for the task that had just failed.

The checkpoints may be any point in an installation process that is convenient. In some instances, checkpoints may be selected to occur before one device installs or configures a service that is dependent on another service that is performed by another device. In other instances, checkpoints may be placed at points in the installation process where an administrator may wish to revert the installation so that a potential problem may be remedied.

Figure 4:
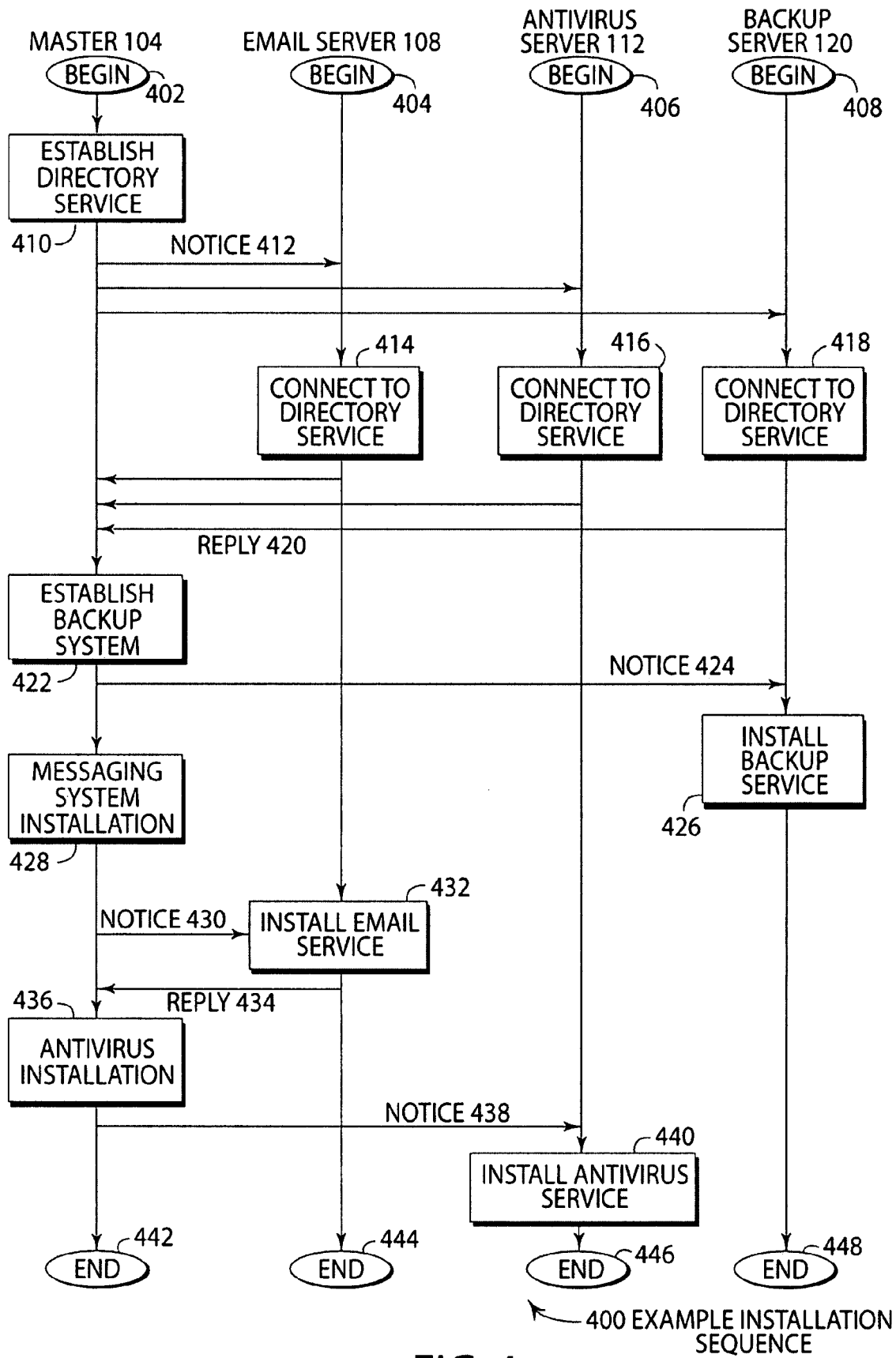
FIG. 4 is a timeline diagram of an embodiment of an example installation sequence.

FIG. 4 is a timeline illustration of an embodiment 400 of an example installation sequence, based on embodiment 100 of FIG. 1. In the left hand column, actions of master server 104 are shown. Moving from left to right, columns contain the actions of the email server 108, anti-virus server 112, and backup server 120. The installation process begins in blocks 402, 404, 406, and 408 for the various servers.

Embodiment 400 is an example of an overall installation process for a group of four servers that perform specific functions. Some of the functions performed by the various servers are dependent on one or more other servers and thus are scheduled appropriately. In the example of embodiment 400, many of the messaging and status relaying steps are omitted for clarity.

Master server 104 may establish a directory server in block 410. After the directory service is installed and operational on master server 104, a notice 412 is sent to the other servers. The notice 412 may indicate to the servers to connect to the directory service, which each do in blocks 414, 416, and 418 and send a reply 420.

If a problem were to occur with one or all of the servers 108, 112, and 120 connecting to the directory service in blocks 414, 416, and 418, an error would have occurred and an administrator may be able to reconfigure the directory service so that it works properly.

Once the directory service is installed and other devices are connected, the master server 104 may send a message in block 422 to establish a backup system. The notice 424 may be transmitted to server 120 which may install a backup server in block 426.

In some instances, each of the servers 108, 112, and 120 may have a predefined sequence of installation steps. For example, the backup server 120 may have a sequence of installation steps that include connecting to the directory service in block 418 and installing a backup server in block 426. In such an instance, the notice 424 indicating to install a backup system may be broadcast to all of the servers 108, 112, and 120.

In other instances, each of the servers 108, 112, and 120 may be instructed by the master server 104 as to which installation task the server is to perform. In such an instance, each of the servers 108, 112, and 120 may have many different installation tasks available to be performed, but the master server 104 may determine which of those tasks are to be executed.

In some embodiments, the master server 104 may send instructions to each device to perform specific installation tasks. The instructions for the tasks may include data for performing the task. Such instructions may be on a task by task basis and may be messages sent to a specific device.

In other embodiments, the master server 104 may determine and send a sequence of tasks to each server 108, 112, and 120. The sequence of tasks may be transmitted to the servers prior to or at the beginning of the installation process. In such a case, the master server 104 may send a short notice to the various servers to proceed to a specific checkpoint. Such messages may be broadcast messages that are received by any device attached to a network.

The master server 104 may perform a messaging system installation in block 428. When the messaging system is completed, a notice 430 may be sent to the email server 108 to install the email processes in block 432. When completed, server 108 may send a reply 434 indicating that the email system is running.

The master server 104 may initiate an anti-virus installation in block 436 by sending notice 438 to anti-virus server 112 to install an anti-virus system in block 440.

The installation is completed in blocks 442, 444, 446, and 448.

Embodiment 400 illustrates a sequence of installation where some installation steps are dependent on other steps and also how a master server 104 may direct other devices to perform portions of an installation sequence.

In embodiment 400, several services are dependent on the establishment of the directory service of block 410. For example, the backup service of block 426 is dependent on the directory service of block 410. Similarly, the anti-virus service of block 440 may be dependent on the email service of block 432, which may be dependent on the messaging system of block 428.

Figure 5:
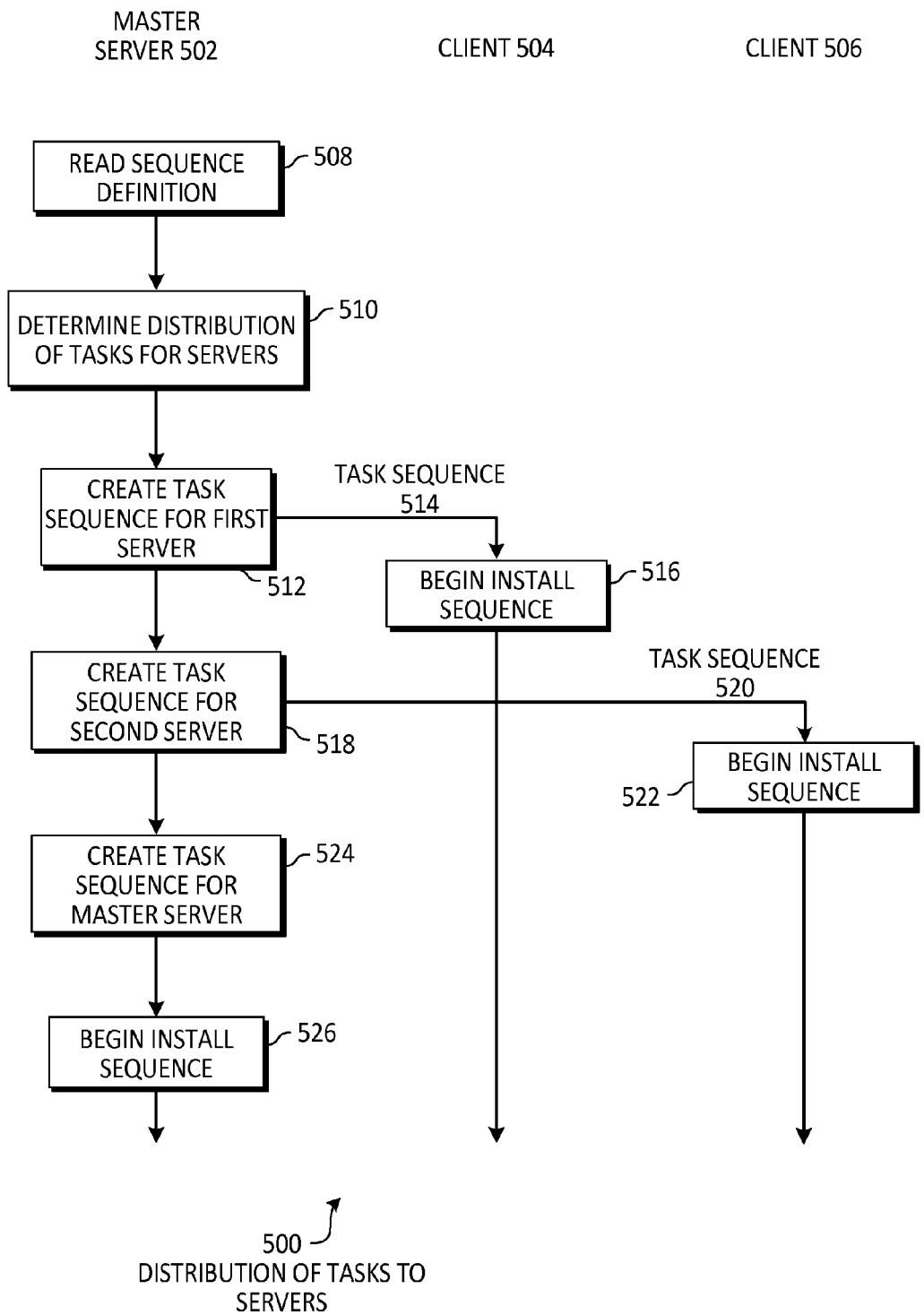
FIG. 5 is a timeline diagram of an embodiment showing the distribution of tasks to different servers.

FIG. 5 is a timeline illustration of an embodiment 500 showing a distribution of tasks for devices. Actions for a master server 502 are shown in the left hand column, actions for a client 504 are shown in the middle column, and actions for client 506 are shown in the right hand column.

The master server 502 reads the sequence definition in block 508. The distribution of tasks for each server is determined in block 510.

A task sequence for client 504 is determined in block 512 and the task sequence 514 is transmitted to client 504, which may begin the install sequence in block 516. Similarly, a task sequence for client 506 is determined in block 518 and the task sequence 520 is transmitted to client 506, which may begin the install sequence in block 522. A master task sequence is determined for the master server in block 524, which the master server begins in block 526.

Embodiment 500 is an example of some preliminary steps that may occur before the execution of the installation sequence. The overall sequence definition is read in block 508 and tasks are distributed amongst servers in block 510. After determining the task distribution, individual task sequences are created for each device and executed.

The distribution of tasks amongst different servers may be performed using different methods. In one example, a discovery routine may examine each device and determine capabilities of the devices and match those capabilities with the desired functions. In another example, an administrator may select specific functions to be performed by specific devices. An administrator may be able to customize or tailor each installation sequence for each device with any type of user interface and using any type of granularity. In some instances, an administrator may be able to create a script or other description of an installation sequence that may incorporate branching, error recovery, or other complex logic.

In some embodiments, the task sequences 514 and 522 may be transmitted to the clients 504 and 506, respectively, as an entire installation sequence. The master server 502 may instruct each client 504 and 506 to proceed to a specific checkpoint or otherwise control the operation of the individual sequences. In other embodiments, the task sequences 514 and 522 may be transmitted to the client 504 and 506 on a piecemeal basis, such as on a task by task or step by step basis. In some instances, the master server 502 may transmit executable files for each task to the clients 504 and 506, such as in the case where a single set of installation media is used to install over several devices.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a master device, a method for installing interdependent components in parallel across a plurality of other devices, the method comprising:
   beginning installation functions at the master device and each of a plurality of other devices in parallel by beginning a distributed installation master process for installing a plurality of components across the master device and the plurality of other devices in parallel, installation of a dependent component, from among the plurality of components, at a device, from among of the plurality of devices, being dependent on successfully completing installation of one or more other different components, from among the plurality of components, at one or more other devices;
   sending a sequence of tasks to proceed with an installation action, the sequence of tasks tailored to install a first component, from among the one or more other different components, at a first device, from among the one or more other devices;
   pausing installation on the device until the one or more other different components are successfully installed;
   receiving a results message indicating that the first component was successfully installed at the first device; and
   subsequent to receiving the results message, sending a further sequence of tasks to the device to proceed with an installation of the dependent component at the device, the further sequence of tasks tailored to install the dependent component at the device.

2. The method of claim 1 further comprising:
   broadcasting an invite message across a network; and
   receiving a response from a specific number of clients.

3. The method of claim 1 further comprising:
   receiving a further results message from a further device, from among the plurality of other devices, the further results message indicating that a further component, from among the one or more other components, was successfully installed at the further device, the dependent component dependent on the further component; and
   wherein sending a further sequence of tasks to the device to proceed with installation of the dependent component comprises sending a further sequence of tasks to the device to proceed with an installation of the dependent component in response to receiving the results message and the further results message.

4. The method of claim 3, wherein receiving a further results message indicating that a further component was successfully installed at a further device comprises receiving a results message indicating that the further component was successfully installed at one of the plurality of other devices.

5. The method of claim 4 further comprising:
displaying an overall status, said overall status comprising status from the master device and one of the plurality of other devices.

6. The method of claim 1, the distributed installation master process comprising at least a portion of at least one of a group composed of a network installation, a directory system installation, and a messaging system installation.

7. The method of claim 1, wherein installation of a dependent component, from among the plurality of components, at a device, from among the plurality of devices, being dependent on successfully completing installation of one or more other components, from among the plurality of components, at one or more an other devices comprises the component being dependent on successful installation of a component at the master device.

8. The method of claim 7, wherein the component being dependent on successful installation of a component at the master device comprises one of a backup service, an email service, and an antivirus service being dependent on a directory service installed at the master device.

9. A computer readable storage medium not comprising a signal but comprising computer executable instructions adapted to perform the method of claim 1.

10. At a master device, a method comprising:
beginning a distributed installation client in parallel at the master device a first client device, and a second client device, the distributed installation client for installing a first component at the first client device and installing a second dependent component at the second client device, the second dependent component dependent on successful installation of the first component;
sending a sequence of tasks to the first client device to install the first component at the first client, the sequence of tasks tailored for installing the first component;
pausing the distributed installation client process on the first client device and the second client device at a first checkpoint, said first checkpoint having a first configuration state for each of the first and second client devices;
receiving a results message from the first device indicating that the first component was successful installed at the first device; and
in response to receiving the results message, sending a further sequence of tasks to the second client device to install the second dependent component at the second client, the further sequence of tasks tailored for installing the second dependent component.

11. The method of claim 10 further comprising:
sending a broadcast message requesting participants in a distributed installation process; and
receiving a participate message from the first client device and the second client device.

12. The method of claim 10 further comprising:
receiving a registration message to from the first client device and the second client device registering for a distributed installation process.

13. The method of claim 10 further comprising:
receiving a status message from the first device, said status message comprising a degree of completion of installing the first coponent.

14. The method of claim 10, the distributed installation client process comprising at least a portion of at least one of a group composed of a network installation, a directory system installation, and a messaging system installation.

15. A computer readable storage medium not comprising a signal but comprising computer executable instructions adapted to perform the method of claim 10.

16. A system comprising:
a network;
a plurality of other devices;
a master device connected to the network and adapted to perform a method of:
beginning installation functions at the master device and each of the plurality of other devices in parallel by beginning a distributed installation master process for installing a plurality of different components across the master device and the plurality of other devices in parallel, installation of a dependent component, from among the plurality of components, dependent on successful installation of one or more other components, from among the plurality of components;
sending a sequence of tasks proceed with an installation action, the sequence of tasks tailored to install a first component, from among the one or more other components, at a first device, from among the one or more other devices;
pausing installation on the device until the one or more other components are successfully installed;
receiving a first results message indicating that the first component was successfully installed at the first device
subsequent to receiving the results message, sending a further sequence of tasks to the device to proceed with an installation of the dependent component at the device, the further sequence of tasks tailored to install the dependent component at the device; and
receiving a second results message from the device;
if the second results message comprises a failed message, sending a revert message to each of the plurality devices to rollback to said first configuration state.

17. The system of claim 16, the master device being further adapted to:
broadcasting an invite message across a network; and
receiving a response from one of the plurality of other devices.

18. The system of claim 16, the master device being further adapted to:
receiving a further results message from a further device, from among the plurality of other devices, the further results message indicating that a further component, from among the one or more other components, was successfully installed at the further device, the dependent component dependent on the further component; and
wherein sending a further sequence of tasks to the device to proceed with installation of the dependent component comprises sending a further sequence of tasks to the device to proceed with an installation of the dependent component in response to receiving the results message and the further results message.

19. The system of claim 16, the master device being further adapted to:
displaying an overall status, said overall status comprising status from said at least two client devices.

20. The system of claim 16, the distributed installation master process comprising at least a portion of at least one of a group composed of a network installation, a directory system installation, and a messaging system installation.

* * * * *